United States Patent [19]

Wells et al.

[11] 4,312,578
[45] Jan. 26, 1982

[54] MICROFILM READER

[75] Inventors: Thomas R. Wells, Des Plaines, Ill.; John W. Overman, Phoenix, Ariz.

[73] Assignee: Bell & Howell Company, Chicago, Ill.

[21] Appl. No.: 143,406

[22] Filed: Apr. 25, 1980

[51] Int. Cl.³ .............................................. G03B 21/24
[52] U.S. Cl. ....................................... 353/79; 353/44; 353/119; 353/26 R; 353/27 R
[58] Field of Search ............... 353/26 R, 27 R, 28, 353/29, 72, 73, 79, 98, 119, 44

[56] References Cited

U.S. PATENT DOCUMENTS

| | | | |
|---|---|---|---|
| 2,258,382 | 10/1941 | Goebel | 353/79 |
| 3,377,915 | 4/1968 | Buckett | 353/79 |
| 3,535,031 | 10/1970 | Spreitzer | 353/79 |
| 3,535,032 | 10/1970 | Hopper | 353/98 |
| 3,632,197 | 1/1972 | Shelton | 353/44 |
| 3,720,463 | 3/1973 | Taylor | 353/27 R |

*Primary Examiner*—John W. Shepperd
*Attorney, Agent, or Firm*—Alan B. Samlan

[57] ABSTRACT

A desk top microfilm reader and work station having a rectangular base enclosing a film housing and projection system. The base has a flat top surface which functions as an operator work surface and an image projection surface. A support arm rises vertically from the base and a hood is attached near the top of the support arm. There are illumination lamps and a mirror in the hood. The lamps illuminate the work surface and are turned off when a micro image is to be projected onto the image projection surface. The optical projection path from the projection system to the mirror in the hood and back to the projection surface is unenclosed.

12 Claims, 9 Drawing Figures

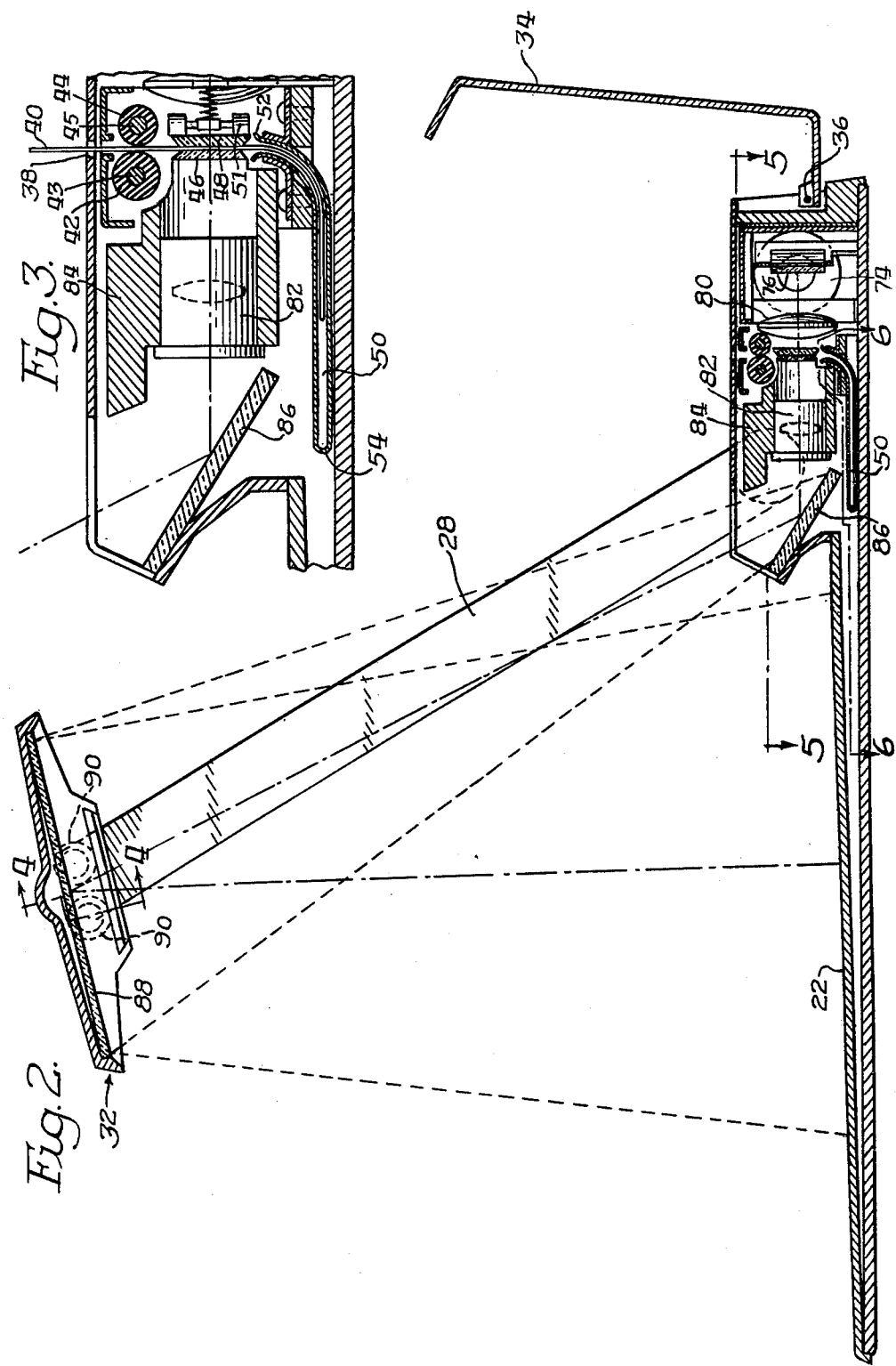

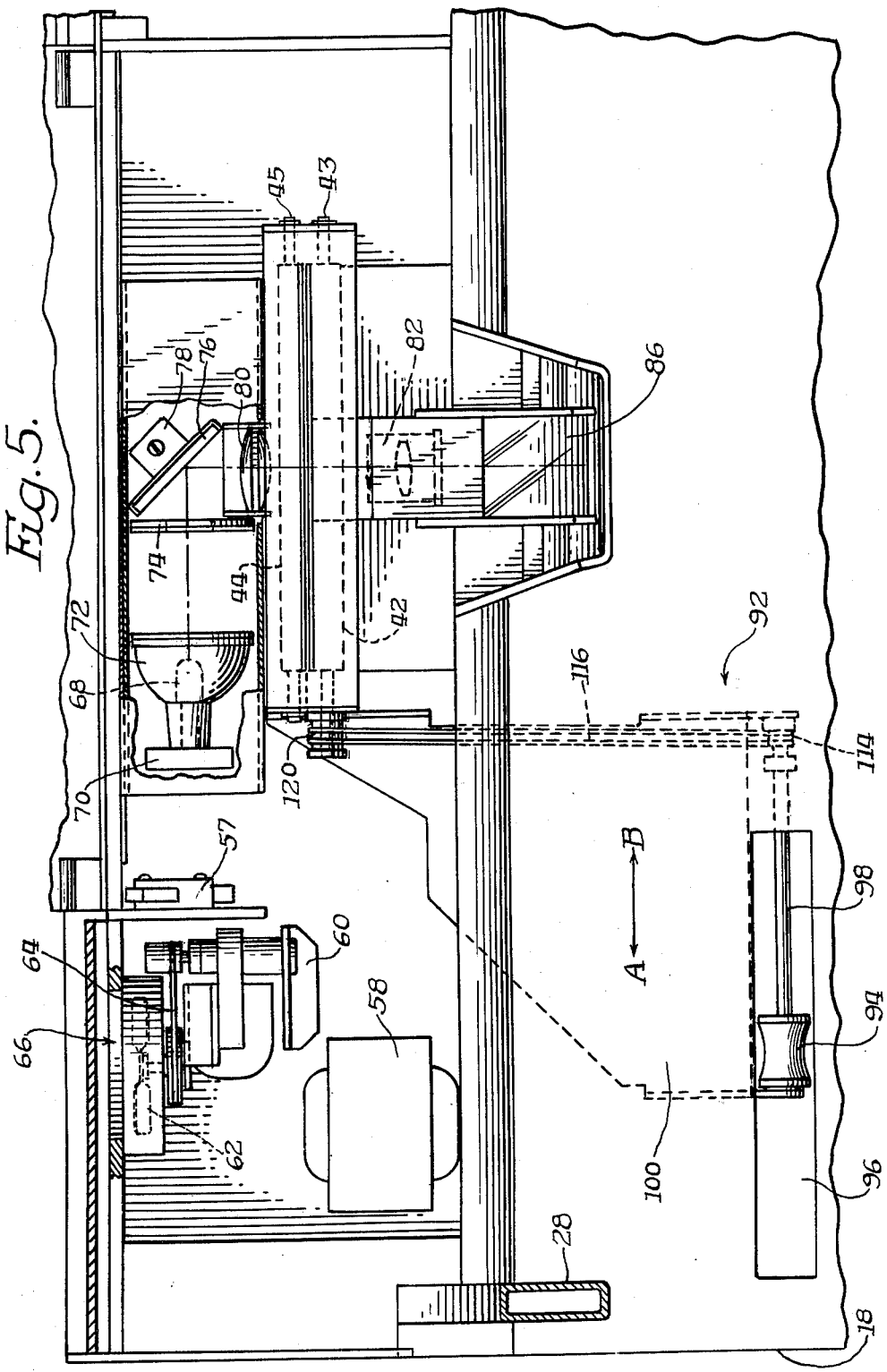

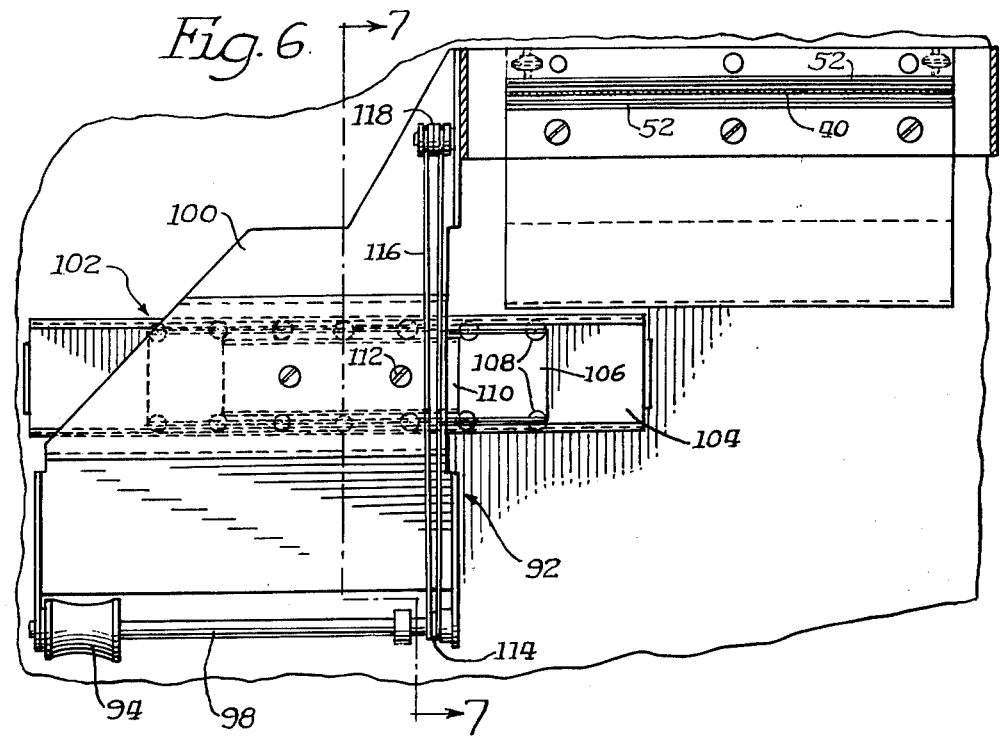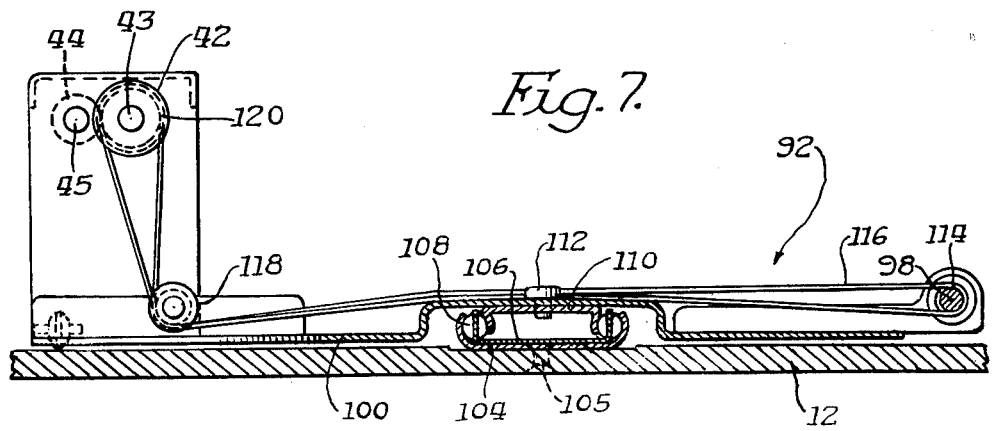

MICROFILM READER

BACKGROUND OF THE INVENTION

This invention relates to microfilm readers, and more particularly to a desk top work station having the capability of projecting microfilm images on to a top surface portion of the desk top work station.

Microfilm is a commonly used form of storing documents or graphical forms of information. The microfilm can take various storage configurations. One form is commonly referred to as microfilm jackets in which individual strips of film are placed between two transparent plastic sheets having channels to accept and retain the film. A second form similar to jackets is microfiche, in which a piece of film approximately 4 inches by 6 inches has the information photographed thereon. Microfiche can also be made by a duplicating process from an original microfilm jacket. The size of the microfiche can vary, however, the concept is to place multiple images on a single card or fiche. Another form is to have a card with a rectangular cut therein holding an individual piece of film, commonly referred to as an aperture card. The information may also be retained on rolls of microfilm which are stored in cartridges or cassettes for later retrieval.

Retrieval of the information stored on the microfilm requires the use of microform display systems such as microfilm readers. Such reader apparatus is well known, and uses a variety of means for performing their functions. Present day microfiche readers commonly use a light source, which may be a high intensity lamp, optical means for condensing the light from the lamp and directing the light through the microfilm, and a second set of optics for projecting the film image onto a reading surface. Thus, the recorded image is projected in an enlarged form to be observed by the operator.

Heretofore, microfilm readers were classified into three categories. A first category is very small handheld film readers which work either with or without a projection lamp. Often the film was placed between an external light source and an eye piece with a lens, held to the viewer's eye and individual images are read through the eye piece. This proved to be a very poor way of reading complete documents as it was inconvenient to locate the particular images, and difficult to read in this manner for any length of time. A preferable means for retrieving and reading information is the "conventional" microfilm reader. These were characteristically of two types. The first employs a rear projection or "transmission" type of screen in which an image is projected on the back of the screen and the image is observed on the opposite side of the screen. The second, is the front projection or "reflection" type in which an image is projected on the screen surface (similar to a movie screen) and the reflected light image is observed.

The problem with the conventional types of microfilm readers is that they are not conducive to the typical office setting. The working desk top area of the average person is generally cluttered with file trays, papers, calendars, desk blotters, etc., leaving little area for a microfilm reader. Furthermore, the area taken by the conventional readers is substantial and normally not justified unless the person sitting at the desk is in constant need of retrieving information on microfilm.

One reason for the large size of conventional readers is that with front or rear projection microfilm readers a complete enclosure is required. Examples can be seen in U.S. Pat. Nos. 3,997,258, and 4,167,310 wherein complete hood arrangements are required with the operator looking down into the base of the hood to view the projected image in the first mentioned patent or at the screen in the second patent. Thus, an operator could not place a device such as this in the center of his desk while trying to work on the same desk surface, or while trying to converse with a person sitting just opposite the microfilm reader.

A microfilm reader which projects downward onto an inclined base is illustrated in U.S. Pat. No. 4,164,367. However, this unit still has a back and side wall which restricts the operator's free accessibility to items other then the reader and also makes it impossible for the operator to carry on a conversation with a person on the other side of the reader. Thus, it is inapplicable for the office desk top use. Also, the projection system is located at the top of the reader making it difficult to place the film in the projection system from a sitting position and obstructs the operators line of vision within the office. A further shortcoming of this unit is that it shields the work area from ambient light at all times making it difficult to work on anything other than reading images from the microfilm.

What is required is a microfilm reader having excellent image projection characteristics, ease of usage, and not take up additional desk area while serving more than the function of being a microfilm retrieval and display device.

SUMMARY OF THE INVENTION

It is an object of this invention to provide a desk top microfilm reader and work station of the above described type which blends into and compliments an office environment. It is a further object to make the best use of the desk top work area by providing a work station capable of storing, retrieving and displaying microfilm while not using any substantially greater area than the average size desk blotter.

It is a further object of the invention to have the top surface of the work station function as an illuminated work area and also as a projection screen for the projected images stored on microfilm.

These and other objects are realized and the problems and limitations of the prior art devices are overcome in this invention. The applicants' work station utilizes a base desk pad structure which houses a microfilm storage, transport and projection system at its uppermost end (i.e. furthest from the operator). The desk pad structure has upstanding from one side a substantially vertical arm which at its uppermost end has a hood extending over the desk pad structure. The hood has lamps to illuminate the desk pad working surface so that the operator can perform his normal work in a well lighted environment. However, should the operator desire to display information retained on microfilm, he simply places the appropriate microfilm into the film projection section on the desk pad, turns the projection system on, and views the appropriate retrieved image on the desk pad surface. The lamps which were in the hood of the reader are automatically turned off to darken the surface area that the image is projected onto.

One of the shortcomings of the prior art is overcome in that the projection path is not enclosed with side and back walls which was a substantial drawback of the prior art. This is achieved by having the hood which extends over the desk pad having a reflecting mirror within it. The projection system projects the image up to the hood and down onto the work surface.

The work station thus functions in one mode as an illuminated work area and in a second mode as a microfilm projection system. It blends into the office environment, serves many individual functions, while occupying less space than units required to serve similar needs.

BRIEF DESCRIPTION OF THE DRAWINGS

FIG. 2 is a sectional view taken along line 2—2 of FIG. 1;

FIG. 3 is an enlarged sectional view with portions removed of the fiche positioning means shown in FIG. 2;

FIG. 5 is a sectional view taken along line 5—5 of FIG. 2 with portions removed;

FIG. 6 is a sectional view taken along line 6—6 of FIG. 2 with portions removed; and FIG. 7 is a sectional view taken along line 7—7 of FIG. 6 with portions removed.

DESCRIPTION OF THE PREFERRED EMBODIMENTS

Figure 1:
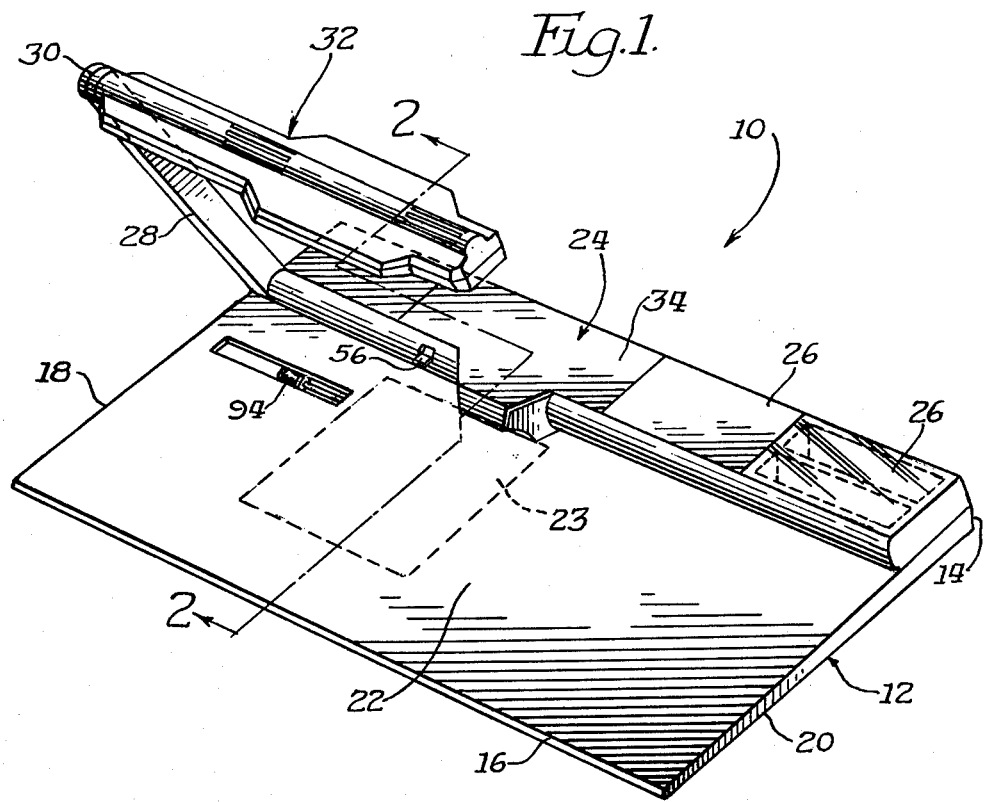
FIG. 1 is a general prospective view showing one embodiment of the microfilm reader and work station according to the present invention.
Figure 4:
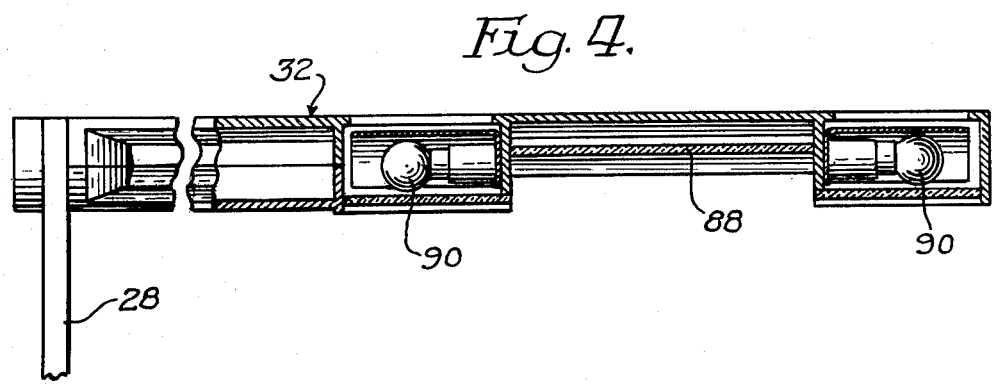
FIG. 4 is a sectional view taken along line 4—4 of FIG. 2 with portions removed.

Turning first to FIG. 1, a desk top microfilm reader and work station 10 (hereinafter referred to as reader 10) is illustrated. It comprises a base structure 12 having a top edge 14, a bottom edge 16, and side edges 18, 20. The base structure 12 has a top surface 22 which has a dual function of being a work area for reading, writing, or other general office work, and also functions as a projection surface with a projection screen area 23 enclosed by the dashed line. Towards the top edge 14, which is the edge furthest from the operator, there is a film housing and projection assembly 24. There are also storage compartments 26 along the top edge 14 which can be used to store microfilm or office materials such as pens, pencils and paper clips.

Near side edge 18 and extending upward is a supporting arm 28 which is fastened by any one of numerous available methods, to the base structure 12. Although this preferred embodiment had the supporting arm 28 adjacent the side edge 18, one could readily see that the supporting arm 28 could be attached near any of the side edges 18, 20, or near the top edge 14.

At an upper end 30 of the supporting arm 28 is a hood 32 which extends from the supporting arm 28 and over the top surface 22.

The mechanics of the fiche receiving mechanism used in the reader 10 can be best seen in FIGS. 2 and 3. A cover 34 (illustrated as in the closed position in FIG. 1) is shown in the open position by means of pivoting it around hinge 36. A slot 38 is exposed which is designed to receive an individual piece of microfiche or jacket 40. A drive roller 42 mounted on drive shaft 43 is rotated to force the fiche downward. Due to friction between the drive roller 42 and microfiche 40, a driven roller 44 mounted on a driven shaft 45 is also caused to rotate. This provides stability and control for movement of the microfiche 40. As the microfiche 40 is forced downward, it passes between glass flats 46, 48 which are used to maintain the fiche in a predetermined location in the projection system. The microfiche 40 is then pushed by means of rollers 42, 44 down into a curved channel 50 via the curved entrance lips 52. The curved channel 50 has a stop 54 which determines the distance which the microfiche 40 can travel within the curved channel 50.

When a switch 56 (FIG. 1) is turned to the "on" position, power is supplied from line voltage, usually 115 volts A.C. to a motor 60 which in turn drives a fan 62 via a belt 64. This provides cooling air for the projection system. Power is also supplied to a transformer 58 (FIG. 5) which the secondary is wired to a mode switch 57.

When the cover 34 is open, an electrical circuit is completed through mode switch 57, energizing a lamp 68 mounted in socket 70. The lamp preferably has a dichroic reflector 72 which projects the visible light and allows the infrared or heat producing rays to pass through the reflector and away from the microfiche 40. A heat absorbing filter 74 further "cools" the light beam by further removing infrared radiation. The light is then reflected by a first mirror 76 which preferably is a dichroic mirror which allows infrared to pass through the mirror and only reflects the visible light waves. Mirror 76 is mounted on a support 78 which can be adjustable to allow for manufacturing tolerances.

The visible light from lamp 68 then passes through a condensor lens 80 which concentrates the light beam as it passes through the microfiche 40. A projection lens assembly 82 mounted in lens support 84 receives the light beam with the image and projects it onto a second mirror 86. The image is then reflected up to a third mirror 88 mounted in the hood 32. The image is then reflected down onto the top surface 22, particularly into the projection screen area 23.

The supporting arm 28 could be rotatably fastened at its lower end to the base structure. This would enable the operator to rotate the arm 28 and hood 32 to any desired position. Preferably detents or latches of some standard design would be utilized so that the supporting arm 28 could be locked into a predetermined projection position whereby the third mirror 88 in the hood would be in its proper alignment to project images onto the projection area 23.

It is preferred that the lens support 84 be threaded to match with mating threads on the projection lens assembly 82 whereby the projection lens 82 can be moved a small distance relative to the plane of the microfiche in the projection path for focusing. One can also see the importance of the glass flats 48, 50 in maintaining the microfiche 40 at a fixed and constant distance from the projection lens assembly 82 for constant focusing. To assist in this, glass flats 48, 50 have a spring loaded mechanism 51 pushing the glass flats together.

When the switch 56 was first turned to the on position and with the cover 34 in the closed position, lamp 68 is in the off mode. However, additional lamps 90 are mounted in the hood 32 which are energized through mode switch 57 upon turning the switch 56 on. Thus, the top surface 22 is illuminated for reading, writing, or whatever work the operator is doing. Only when the cover 34 is lifted, is the projection lamp energized and the illuminating lamps 90 turned off through mode switch 57. It is desirable that the illuminating lamps 90 be turned off in the projection mode to cut down on extraneous light striking the projected image which would greatly reduce the contrast and readability of the image.

A fiche positioning assembly 92 is best seen in FIGS. 5 through 7. In FIG. 5, there is a thumb wheel 94 protruding up through channel 96 cut in the surface 22. The thumb wheel 94 is mounted on a shaft 98 which in turn is part of or affixed to a movable base structure 100. The movable base structure 100 is allowed free movement in the direction of arrow A-B as seen in FIG. 5.

A roller carriage assembly 102 is explicitly illustrated in FIGS. 6 and 7. A fixed base plate 104 is secured by means of a fastener 105 to the base structure 12. There is a ball bearing structure 106 with ball bearings 108 retained by the fixed base plate 104 such that the ball bearing structure 106 can move only in the A-B direction. A sliding plate 110 is affixed to the movable base structure 100 by means of a fastener 112 and allowed to roll with bearing structure 106. Thus, one can see that the movable base structure 100 is allowed to move in the A-B direction by means of the roller carriage assembly 102.

At one end of the shaft 98 is a thumb wheel pulley 114 which has a belt 116 wrapped around it. The opposite end of the belt 116 is wrapped around drive pulley 120 via idler pulley 118. It can be seen that drive pulley 120 is mounted on the drive shaft 43 which also has the drive roller 42 mounted thereon. Thus, as thumb wheel 94 is turned, the belt 116 causes the drive pulley 120 to rotate, which causes the drive roller 42 to rotate which in turn controls the vertical movement of the microfiche 40. In this manner, specific horizontal rows from a microfiche can be selected for projection. The particular column desired on the microfiche can likewise be selected and placed in the projection light path by moving the fiche positioning assembly 92 in the A-B direction as the rollers 42, 44 and associated shafts are mounted on the common movable base structure 100.

The fiche receiving means can also be a fiche carriage as illustrated in U.S. Pat. No. 3,941,466 incorporated herein by reference. The projection system would have to be slightly modified to accommodate horizontally held microfilm, but such modification could be done by those skilled in the art.

Figure 8:
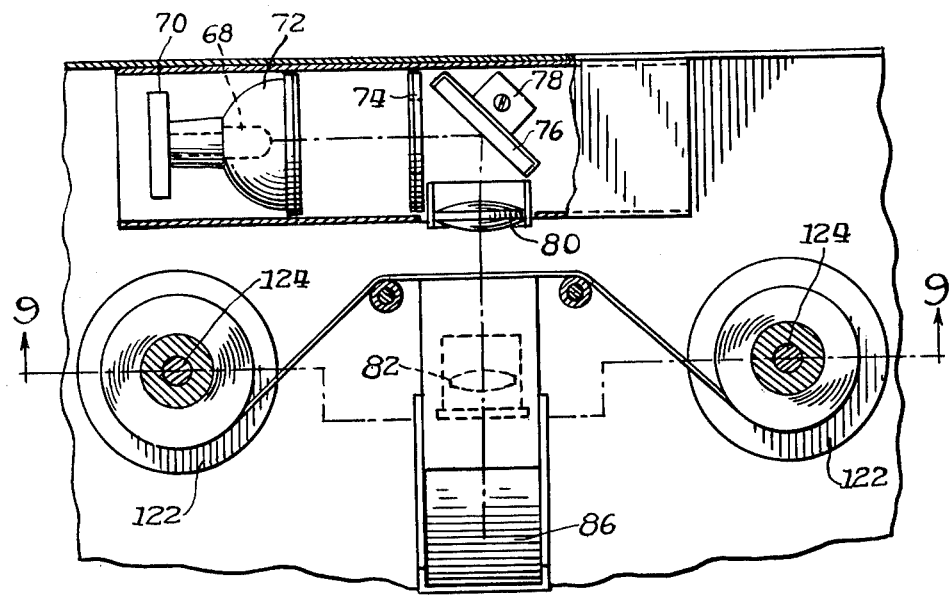
FIG. 8 is a sectional view similar to FIG. 5 showing an alternate embodiment of the microfilm reader modified to accommodate a roll film retrieval system.
Figure 9:
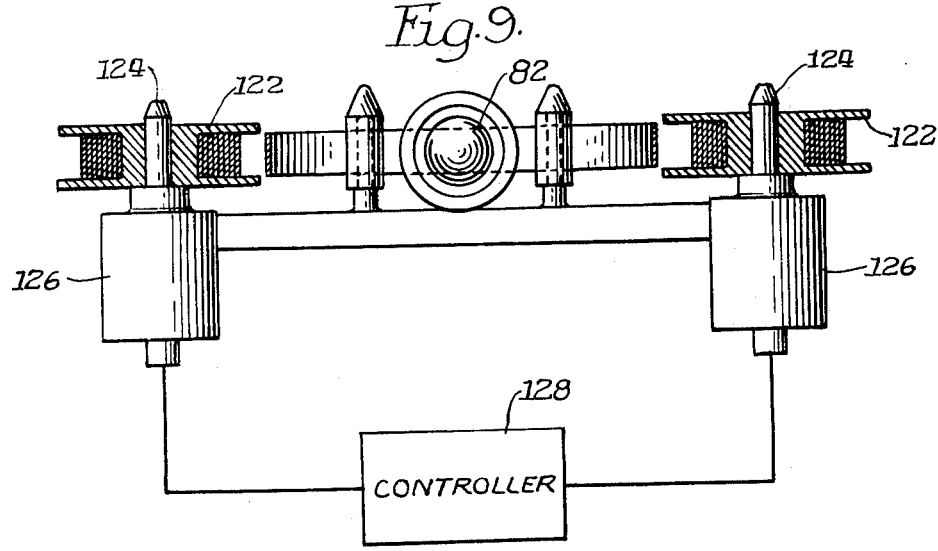
FIG. 9 is a partially schematic, partially sectional view taken along line 9—9 of FIG. 8 with portions removed.

One could also modify this particular reader to accommodate a roll film retrieval system such as illustrated in U.S. Pat. No. 4,164,367. FIGS. 8 and 9, illustrate such a modified system in which spools of microfilm 122 are mounted on spindles 124. The spindles 124 are connected to motors 126 which are controlled by a conventional motor controller 128 to move the film to the desired image location. There are numerous other film transport systems for roll film, some of which utilize cartridges and others which utilize cassettes. However, the particular mode of storing information on microfilm is not crucial to the operation of applicant's invention.

Applicant's invention provides a work station in which the operator has an illuminated work area which is transformed into a microfilm projection system without the operator ever going to any additional microfilm equipment. His work area is not substantially diminished and the extinguishing of the illumination lamps 90 provides sufficient darkening of the projection area to allow easy viewing of the projected images. Furthermore, the optical projection path from the film housing and projection assembly 24 to the projection screen area 23 is not enclosed. Thus, the operator has an unobstructed view of his office, people who he could be having a conference with, and still be retrieving and projecting images onto the projection screen area 23. Also, the operator has the capability of writing or working on the top surface 22 while he is simultaneously projecting an image into the projection screen area 23. The movement of the operator and accessibility to other items is not restricted such as in prior microfilm readers because the projected image is not within an enclosure.

Thus, it is apparent, there has been provided, in accordance with the invention, a microfilm reader and work station that fully satisfies the objects, aims and advantages set forth above. while the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A desk top microform reader and work station comprising:

a base structure defining a common flat surface, which functions as an operator work surface and an image display surface;

a supporting arm supported by the base structure and extending vertically from the flat surface;

a hood supported by the supporting arm in spaced relationship with respect to the common flat surface, the hood supporting a reflection means and an illumination source adapted to be selectively energized and illuminate at least a portion of the common flat surface;

projection means connected to the base structure for projecting onto the common flat surface an optical image corresponding to an image carried on a microform when disposed in the projection means in response to selective energization of the projection means and de-energization of the illumination source;

switch means to provide selective energization of the projection means and illumination course such that when the projection means is energized the illumination source is de-energized;

a substantially unenclosed optical image projection path extending from the projection means, to the reflecting means, and to the common flat surface, whereby in one operator initiated mode of operation, the illumination source is de-energized and a readable image is projected onto the surface without the need of an enclosure to exclude ambient light.

2. The reader and work station as in claim 1 wherein the projection means includes a projection lamp, condensing lens, focus means and film receiving and positioning means, said film receiving means comprising a slot in the film housing to receive an individual piece of microfiche held in a vertical position.

3. The reader and work station as in claim 2 wherein the film receiving and positioning means further comprises roller means within the projection means, the roller means in contact with the microfiche, means to rotate the roller means whereby when the roller means are rotated, the roller axis remains fixed and the microfiche is moved vertically.

4. The reader and work station as in claim 3 wherein the roller means comprises at least two rollers with a nip therebetween to received and retain the microfiche, and the means to rotate the roller means comprises a thumbwheel which is in rotational engagement with at least one of the two rollers.

5. The reader and work station as in claim 2 wherein the film receiving means comprises a horizontal fiche carriage to receive and retain an individual piece of microfiche held in a horizontal position.

6. The reader and work station as in claim 2 wherein the film receiving and positioning means further comprises a slide carriage assembly within the projection means wherein microfiche received therein can be moved relative to the projection lamp for image selection.

7. The reader and work station as in claim 2 wherein the film receiving and positioning means comprises at least one spindle to receive microfilm stored on a spool.

8. The reader and work station as in claim 2 or 7 wherein the film receiving and positioning means comprises a motor driven film transport assembly to retrieve selected images stored on the spool of microfilm.

9. The reader and work station as in claim 1 further comprising film receiving and positioning means comprising a slide carriage assembly within the projection means wherein microfiche received therein can be moved for image selection.

10. The reader and work station as in claim 1 wherein the supporting arm is rigidly affixed at its lower end to the base structure and the hood is rigidly attached at its upper end whereby the reflecting means are in fixed alignment with the projection means.

11. The reader and work station as in claim 1 wherein the supporting arm is rotatably fastened at its lower end to the base structure whereby the supporting arm and hood can be pivoted to various positions.

12. A system for selectively displaying projected microfilm images at a work station defined by a portion of a flat surface adapted to be selectively illuminated in the absence of the display of said images comprising:
    a supporting arm connected to the flat surface and extending vertically from the flat surface;
    a hood supported by the supporting arm above the flat surface, the hood supporting a reflecting means and an illumination source adapted to be selectively energized for illuminating at least a portion of the flat surface;
    a film housing assembly means including a projection lamp, lens, focusing means and film receiving and positioning means, the film housing means connected to the flat surface;
    switch means to provide selective energization of the projection lamp and illumination source such that when the projection lamp is energized the illumination source is de-energized;
    a substantially unenclosed optical image projection path extending from the film housing assembly, to the reflecting means, and to the common flat surface, whereby in one operator initiated mode of operation the illumination source is de-energized and a readable image is projected onto the flat surface without the need of an enclosure to exclude ambient light, and in another operator initiated mode of operation, the projection lamp is de-energized and the illumination source is energized to illuminate the flat surface.

* * * * *